(12) United States Patent
Bruso et al.

(10) Patent No.: US 11,296,887 B2
(45) Date of Patent: Apr. 5, 2022

(54) BLOCKCHAIN MECHANISM FOR SAFETY-CRITICAL SYSTEMS

(71) Applicants: Kelsey L Bruso, Eagan, MN (US); Kevin Flanders, Eagan, MN (US)

(72) Inventors: Kelsey L Bruso, Eagan, MN (US); Kevin Flanders, Eagan, MN (US)

(73) Assignee: UNISYS CORPORATION

(*) Notice: Subject to any disclaimer, the term of this patent is extended or adjusted under 35 U.S.C. 154(b) by 255 days.

(21) Appl. No.: 16/529,898

(22) Filed: Aug. 2, 2019

(65) Prior Publication Data

US 2021/0036858 A1 Feb. 4, 2021

(51) Int. Cl.
*H04L 9/32* (2006.01)
*H04L 9/06* (2006.01)
*G06K 9/00* (2022.01)

(52) U.S. Cl.
CPC ........ *H04L 9/3231* (2013.01); *G06K 9/00261* (2013.01); *H04L 9/0643* (2013.01); *H04L 9/321* (2013.01); *H04L 2209/38* (2013.01)

(58) Field of Classification Search
None
See application file for complete search history.

(56) References Cited

U.S. PATENT DOCUMENTS

| | | | | |
|---|---|---|---|---|
| 2002/0034975 | A1* | 3/2002 | Walker | G07F 17/32 463/21 |
| 2005/0043897 | A1* | 2/2005 | Meyer | G06Q 30/02 702/19 |
| 2005/0122209 | A1* | 6/2005 | Black | G06Q 20/341 340/5.52 |
| 2010/0014717 | A1* | 1/2010 | Rosenkrantz | H04N 5/44 382/115 |
| 2015/0262176 | A1* | 9/2015 | Langschaedel | G06Q 20/0658 705/71 |
| 2017/0163733 | A1* | 6/2017 | Grefen | H04L 9/3236 |
| 2017/0206382 | A1* | 7/2017 | Rodriguez De Castro | H04L 9/3239 |
| 2018/0167198 | A1* | 6/2018 | Muller | G06F 21/44 |
| 2019/0188699 | A1* | 6/2019 | Thibodeau | G06Q 20/3827 |
| 2020/0285836 | A1* | 9/2020 | Davis | G06F 21/32 |

* cited by examiner

*Primary Examiner* — William J. Goodchild

(57) ABSTRACT

A computing system architecture includes a service server and a first validator. The first validator is communicable to the service server. A validation request is sent from the service server to the first validator for validating a transaction. The validation request including a first facial image of a party of the transaction. The validator performs a facial recognition using the first facial image of the party for validating the transaction.

10 Claims, 5 Drawing Sheets

BLOCKCHAIN MECHANISM FOR SAFETY-CRITICAL SYSTEMS

FIELD OF THE DISCLOSURE

The present invention relates to blockchain use in critical systems. More specifically, the present invention relates to computational architectures, apparatuses, and methods for validating a transaction in a blockchain using a multiple, adversarial validation strategies.

BACKGROUND

Blockchain is a concept of validating and recording an individual or a chain of transactions in a decentralized computing architecture. When a transaction happens, one or more validators would validate the transaction for possible inclusion into the distributed ledger which represents the blockchain. Once validated, a transaction ledger entry, also known as a block, is created and integrated into the existing chain of transactions, e.g., a chain of ownership changes of a good or a piece of digitized currency. A large number of repetitive copies of the transaction ledger is stored on different computers over the internet, e.g., end user computers, servers, etc. This practice of storing large number of repetitive copies of ledgers denotes the concept of decentralization, of which some consider important to a blockchain system.

Blockchain represents an ordered set of transactions that have been validated or confirmed within the system up to a certain point in time. For security purposes, the blockchain is supposed to include only valid transactions and, as far as these transactions are included in the ledger, it should be impossible for someone to alter or remove the recorded ledger entry from the blockchain. Most cryptocurrencies implement a distributed ledger, comprised of the peers in the network, i.e., by having the network peers decide which transaction should be validated by means of a consensus protocol.

Blockchain techniques rely on a public/private key pair for securing information in a transaction in a block and for proving the identity of each party to a transaction. To enter a new transaction into a blockchain system, the parties who participate in the transaction each encrypt a portion of the transaction using their private key. The encrypted portion of the transaction can be decrypted using the party's public key.

One of the main benefits of a decentralized ledger is that it can be public, and the transactions in it publicly verifiable. That is, every user of the system may be able to obtain a copy of the ledger, and his/her transactions, verify that the list of transactions in the ledger are valid, and verify the correctness of the ledger itself, for example, by confirming that the entity that extends the ledger by adding more transactions to it confirms only valid transactions.

A major technical issue exists in the current blockchain system. The validation process is not sufficiently robust to meet the needs of safety-critical systems. The current validation algorithms are designed for each validator to use exactly the same validation technique. Early safety-critical systems used this approach as well, where multiple systems performed the same calculation on the same input data and then compared the results to ensure they match.

The embodiments herein disclosed provide improved mechanisms in safety-critical systems by using "adversarial algorithm" approach. An adversarial algorithm includes a multi-channel voting process where multiple systems perform different calculations by using different algorithms (e.g., facial and/or finger print recognition algorithms) on the same input data (e.g., same facial and/or finger print images) and then compare the results to achieve consensus. For example, in facial recognition, one algorithm uses eye color, eye sizes, distance between eyes, lip shape/size, nose shape/size, cheek shape, etc. to match faces. A second algorithm uses skin tone and retinal features. A third algorithm uses 65,000 criteria on the face rather than the more-common 80 criteria.

Algorithms such as for facial and/or finger print recognition operate accurately when the conditions are favorable: good lighting, person facing directly into the camera, good focus on the face, high resolution in the image, and so on. When the conditions are not favorable, each algorithm has more false positives or false negatives along with the accurate identifications. Applying multiple (adversarial) algorithms to the analysis and comparing the outcome creates a more robust and accurate system. The embodiments disclosed herein provide a mechanism to enable an adversarial algorithm approach to transaction validation that is much more robust compared to current methods.

SUMMARY

The present invention relates to blockchain as it applies to safety-critical systems. More specifically, the present invention relates to computational architectures, apparatuses, and methods for validating a transaction in a blockchain using a multiple, adversarial validation strategy incorporating multiple validation algorithms.

A major technical issue exists in the current blockchain system. The validation process is not sufficiently robust to meet the needs of safety-critical systems. The current validation algorithms are designed for each validator to use exactly the same validation technique. Early safety-critical systems used this approach as well, where multiple systems performed the same calculation on the same input data and then compared the results to ensure they match.

The embodiments disclosed provide improved mechanisms in safety-critical systems by using "adversarial algorithm" approach. An adversarial algorithm includes a multi-channel voting process where multiple systems perform different calculations by using different algorithms (e.g., facial and/or finger print recognition algorithms) on the same input data (e.g., same facial and/or finger print images) and then compare the results to achieve consensus. For example, in facial recognition, one algorithm uses eye color, eye sizes, distance between eyes, lip shape/size, nose shape/size, cheek shape, etc. to match faces. A second algorithm uses skin tone and retinal features. A third algorithm uses 65,000 criteria on the face rather than the more-common 80 criteria.

Algorithms such as for facial and/or finger print recognition operate accurately when the conditions are favorable: good lighting, person facing directly into the camera, good focus on the face, high resolution in the image, and so on. When the conditions are not favorable, each algorithm has more false positives or false negatives along with the accurate identifications. Applying multiple (adversarial) algorithms to the analysis and comparing the outcome creates a more robust and accurate system. The embodiments disclosed herein provide a mechanism to enable an adversarial algorithm approach to transaction validation that is much more robust compared to current methods.

Facial recognition algorithms use a set of criteria to describe a person's face. An example algorithm uses a set of 100 criteria to describe a face. When comparing two facial images, each described using 100 criteria, if 80 of the criteria match and 20 of the criteria do not match, the comparison reports a confidence score of 80% that the facial images match. Different algorithms use more or fewer criteria with different results. Some authorization systems use facial recognition as a biometric identifier either alone or in conjunction with other proofs of identity such as a password for a multi-factor authentication approach. Other authorization systems use fingerprint images as a biometric identifier. Similar to facial recognition, fingerprint recognition algorithms use a set of criteria to describe a person's fingerprint. Fingerprint comparison processing likewise returns a confidence score that two fingerprints match. Incorporating adversarial validation algorithms into the blockchain transaction validation mechanism makes the blockchain technique applicable to a wider set of transaction types. Requiring validation of facial features of one or more parties of a transaction or requiring validation of fingerprint features of one or more parties of a transaction makes the transaction more secure comparing to simply knowing the party's public key or password.

Regarding the technical issue, embodiments disclosed herein introduce an adversarial validation mechanism into the transaction validation process. The embodiments disclosed herein aim to resolve three aspects of the technical issue. First, the applicability of the mechanism to transaction validation in blockchain transactions. Second, how a set of algorithms and threshold values may be encoded into the blockchain system. Third, how the algorithms and validators are managed during transaction validation.

Regarding the technical issue, embodiments disclosed herein apply broadly to the kinds of algorithms used during the validation process. Examples of current validation algorithms inquire "does the sender have more than X amount of digitized currencies in his wallet?" or "Does the seller of this Gucci handbag have provenance of ownership?" or "Did the shipper of this pallet of fruit complete all required paper works?" or "Does the facial image of a party to the transaction included with the transaction match a previously stored facial image of the same person?" Each of the above mentioned approaches is independent from each other.

Regarding the first technical issue aspect, the facial features of a person are relatively stable over time. Facial features used in the embodiments herein for facial recognition includes eye color, eye sizes, retina pattern, distance between eyes, lip shape/size, nose shape/size, cheek shape, etc. The time frame of a facial feature of a person to change is much longer than the frequency of conducting transactions by that person. Some algorithms attribute more or less importance to each of the criteria by assigning each criterion a weighting factor—the higher the weighting factor the more impact that criterion has on determining the confidence score. Each algorithm uses a different set of criteria and different weightings for each criterion.

In one embodiment, the adversarial validation algorithms perform facial recognition. In another embodiment, the adversarial validation algorithms perform fingerprint recognition. Additional embodiments use other adversarial validation algorithms for other purposes. The adversarial validation mechanism is used for transaction validation purpose.

The second technical issue aspect includes the location or indicia for finding the set of adversarial algorithms. A first embodiment encodes the algorithms or other indicia for the algorithms in the genesis block of the blockchain. The genesis block describes the nature of the blockchain and rules for participating in the blockchain. A second embodiment encodes the algorithms or an indicia for the algorithms in a smart contract of the blockchain. A third embodiment encodes the algorithms in the validators.

The second technical issue aspect includes the location or indicia for finding the criteria for the number of times each algorithm in the set of algorithms must be executed during the validation of a transaction. A first embodiment uses a specific minimum number, for example, algorithm A must execute at least one time, algorithm B must execute at least two times, and algorithm C must execute at least one time. A second embodiment uses a percentage of the validators, for example, algorithm A must be executed by at least 20% of the validators, algorithm B must be executed by at least 30% or the validators, and algorithm C must be executed by at least 25% of the validators. Other embodiments use other sets of minimum or maximum values or formulas to ensure each algorithm in the set of algorithms is executed during the validation of a transaction. Each embodiment may define specific criteria for each algorithm or may define criteria that apply equally to all algorithms.

Regarding the location or indicia for finding the criteria for the minimum number of times each algorithm in the set of algorithms must be executed during the validation of a transaction, a first embodiment includes the criteria or other indicia for the criteria in the genesis block of the blockchain. The genesis block describes the nature of the blockchain and rules for participating in the blockchain. A second embodiment includes the criteria or other indicia for the criteria in a smart contract of the blockchain. A third embodiment includes the criteria or other indicia for the criteria in the transaction itself, passed by the parties of the transaction.

Regarding the third technical issue aspect, the member service manages the transaction validation process and ensures the criteria for executing each adversarial algorithm in the set of algorithms. In a first embodiment, the member service uses a randomizing agent to cause each validator to choose one of the algorithms from the set of algorithms. In a second embodiment, the member service assigns a specific algorithm to each validator.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
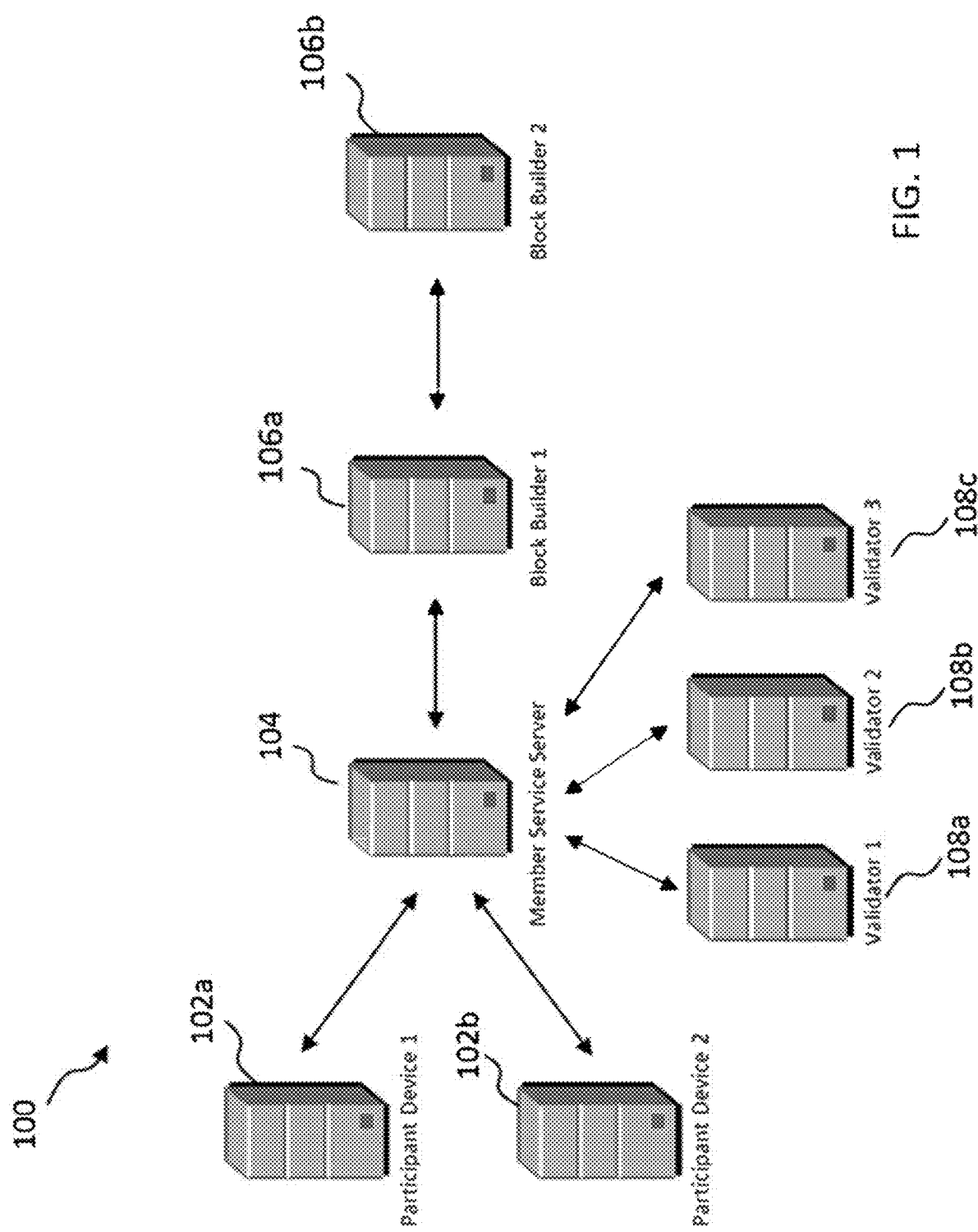
FIG. 1 is a diagram of blockchain system communication architecture according to one embodiment of the disclosure.

FIG. 1 is a diagram of blockchain system communication architecture 100 according to one embodiment of the disclosure. The architecture includes a plurality of participant devices 102a, 102b. The participant devices 102a, 102b can be the buyer or seller of goods or services. In one embodiment, the first participant device 102a is a seller in a transaction and the second participant device 102b is a buyer in the same transaction.

The member service server 104 receives transaction requests from the participant devices 102a, 102b. In one embodiment, the member service server 104 is a platform for conducting the transaction. In another embodiment, member service server is a validator, elected to oversee the validation for the transaction submitted by participant device 102a, 102b. The member service server 104 receives a record validation request from a participant device 102a, 102b. The request can include information about the transaction, e.g., the identity of a party of the transaction, the facial image of the party, the serial number of the participant device 102, the remaining balance of the electronic wallet of the party, the ownership of goods/services associated with the party, or the like. Some information in the transaction is encrypted using the private key of a party of the transaction. In one embodiment, the facial image of the party is encrypted using the party's private key.

The member service server 104 distributes the validation request to a plurality of validators 108a, 108b, 108c. The validators 108a, 108b, 108c may receive the request at different timing, e.g., milliseconds or nanoseconds apart. The different timings may be caused physically by the internet connection, e.g., the electrical signal passes through different number of routers, different communication protocols, different physical connections (e.g., wireless, electrical wire, fiber optics, etc.), or the like. In one embodiment, the validators use the different timings of the request being received as seeds for randomly selecting a validation method.

Each of the validators 108a, 108b, 108c conduct one or more independent examinations of the information included in the request for validating the transaction. The algorithms may include different facial recognition algorithms. Different facial recognition algorithms may examine different facial features, e.g., skin tone, hair color, eyebrow color, eye color, eye sizes, retina pattern, distance between eyes, lip shape/size, nose shape/size, cheek shape, etc. In one embodiment, the algorithm may give different weights to different facial features. For example, one facial recognition algorithm can be generally expressed as $Q=w_1f_1+w_2f_2+w_3f_3+\ldots w_nf_n$, wherein Q is a final score; w is a weight factor for the corresponding facial feature; f is the facial feature; n is any positive integer. In one embodiment, the various w are coefficients, wherein the summations of $w_i$ is 1, which can be expressed as $1=\Sigma_{i=1}^{n} w_i$. In some embodiments, different facial recognition algorithms may have different combination of facial features and weight factors for the facial features. Each algorithm may have a first predetermined threshold $\theta$ for Q, if $Q \geq \theta$, than the determination is "pass;" if $Q<\theta$, then the determination is "fail."

In another embodiment, the facial recognition algorithm includes digital alteration recognition, e.g., Photoshop altered images. In one embodiment, the digital alteration recognition recognizes the facial features being digitally altered and restores the altered image to its original form.

The member service server 104 receives a pass/fail signal from each of the validators 108a, 108b, 108c. The validators 108a, 108b, 108c determine whether the information included in the request being sufficient and valid for validating the particular transaction. A "pass" signal means the record validation request includes information sufficient for validating an associated transaction. A "fail" means the record validation request does not include sufficient information for validating the associated transaction.

The member service server 104 determines whether a threshold percentage of the validators 108a, 108b, 108c provide a "pass" signal. If the threshold percentage is met, the member service server 104 will validate the transaction. If the threshold percentage is not met, the member service server 104 will terminate the transaction. In one embodiment, the threshold percentage is 51%, that is, 51% of the validators must provide a "pass" signal.

If the transaction is validated, the member service server 104 broadcasts the validated transaction to a plurality of block builder 106a, 106b for inclusion into the next block of the blockchain. In one embodiment, the set of block builder 106 are different from the set of validator 108. In another embodiment, each block builder 106 may also play the role of validator 108.

The new block will be annexed to the blockchain. In one embodiment, the new block includes the identity of the new owner of the goods/services transacted and the facial image of the new owner. The facial image is stored in the blockchain such that a subsequent transaction can use the stored facial image for further processing.

Figure 2:
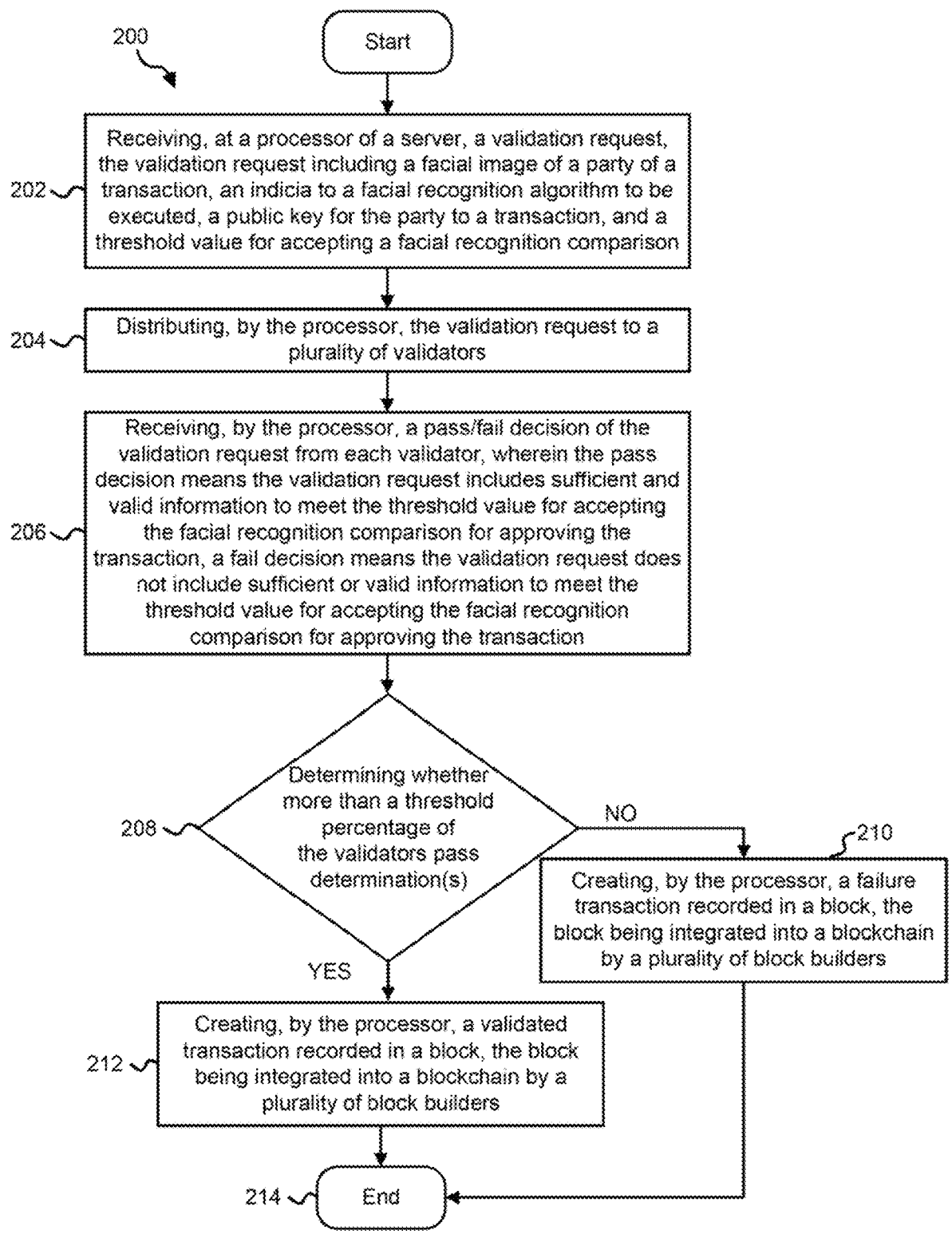
FIG. 2 is a method of transaction validation for a member service server according to one embodiment of the disclosure.

FIG. 2 is a method 200 of transaction validation for a member service server according to one embodiment of the disclosure. The method 200 can be used by the member service server 104.

The method 200 includes 202 receiving, at a processor of a server, a validation request. The validation request includes a presented facial image of a party of the transaction. The blockchain genesis block, smart contract, or other indicia encodes a set of adversarial recognition algorithms for validating the transaction. In one embodiment, the adversarial recognition algorithm includes a plurality of validation algorithms that are facial recognition algorithms. In one embodiment, the transaction validation request includes the public key of the party of the transaction. In one embodiment, the transaction validation request includes a threshold value for accepting a facial recognition comparison.

In other embodiments, the validation request at 202 can include the following information about the transaction, e.g., the identity of a party of the transaction, the facial image of the party, the serial number of the participant device, the remaining balance of the electronic wallet of the party, the ownership of goods/services associated with the party, or the like.

The method 200 includes 204, distributing, by the processor, the record validation request to a plurality of validators, wherein each validator uses a validation method determined by a random selection process that uses time as a factor to select the validation method.

Almost for certainty, various validators will receive the validation request at different timing, e.g., milliseconds or nanoseconds apart. The different timings can be caused physically by the internet connection. For example, for a same validation request to reach different validators, the electrical signal of the request needs to pass through different number of routers, different communication protocols, different physical connections (e.g., wireless, electrical wire, fiber optics, etc), or the like which all results in different timings of reception. In another example, different validators may have different processing speed, e.g., operational frequency of a central processing unit (CPU), or networking processor, which may also result in different timings of reception. At 204, the validators use the different timings of the request being received as seeds for randomly selecting a validation method. At 204, the validation method randomly selected can be different facial recognition algorithms.

The method 200 includes 204, distributing, by the processor, the validation request to a plurality of validators (e.g., 108a, 108b, 108c). At 204, each of the validators may conduct one or more independent examinations of the information included in the validation request for validating the transaction. The blockchain genesis block, smart contract, or other indicia indicates the set of algorithms for facial recognition from which the validator chooses. Various validation method at 204 may include different facial recognition algorithms. Different facial recognition algorithms may examine different facial features, e.g., skin tone, hair color, eyebrow color, eye color, eye sizes, retina pattern, distance between eyes, lip shape/size, nose shape/size, cheek shape, etc. In one embodiment, different facial recognition algorithms may give different weights to different facial features. For example, one facial recognition algorithm can be generally expressed as $Q=w_1f_1+w_2f_2+w_3f_3+\ldots w_nf_n$, wherein Q is a final score; w is a weight factor for the corresponding facial feature; f is the facial feature; n is any positive integer representing numbers of facial features considered in the algorithm. In one embodiment, the various $w_i$ are coefficients, wherein the summations of $w_i$ is 1, which can be expressed as $1=\Sigma_{i=1}^n$. In some embodiments, different facial recognition algorithms may have different combination of facial features and weight factors. As input to a transaction validation, one embodiment uses the genesis block of the blockchain to the threshold value $\theta$ for Q. A second embodiment includes the threshold value or other indicia for the threshold value $\theta$ for Q in a smart contract of the blockchain. A third embodiment includes the threshold value or other indicia for the threshold value $\theta$ for Q in the transaction itself, passed by the parties of the transaction. Where the embodiment includes a threshold value, if $Q>\theta$ or $Q=\theta$, then the determination is "pass;" if $Q<\theta$, then the determination is "fail."

In another embodiment, the facial recognition algorithm at 204 includes digital alteration recognition, e.g., Photoshop altered images. In one embodiment, the digital alteration recognition recognizes the facial features being digitally altered and restores the altered image to its original form.

The method 200 includes 206 receiving, by the processor, a pass/fail decision of the validation request from each validator, wherein the pass decision means the validation request includes sufficient and valid information for approving the transaction, a fail decision means the validation request does not include sufficient or valid information for approving the transaction. One reason for receiving a "fail" decision is that the facial image criteria presented in the transaction fails to match with the facial image criteria of a previously stored facial image. Another reason for receiving a "fail" decision is that the match confidence score (Q) is less than the threshold value ($\theta$) for approving the transaction.

In another embodiment, at 206, when the validator returns the pass/fail decision, the validator may also return an identification information, e.g., a serial number, of the validation algorithm executed. This helps the service server 104 to record which algorithm is used by which validator and make further statistical analyses in 208.

The method 200 includes 208 determining whether two or more adversarial validation algorithms were used by the plurality of validators. In blockchain methodology applied to safety-critical systems, the more validation methods being used means higher level of security of the transactions. Thus, as in 208, in some embodiments, it is preferred to have at least two or more validation methods being used by the validators. According to one embodiment, the genesis block encodes the value or other indicia for the criteria for the number of times each algorithm in the set of algorithms must be executed during the validation of a transaction. A second embodiment encodes the value or other indicia in a smart contract of the blockchain. A third embodiment encodes the value or other indicia in the transaction itself, passed by the parties of the transaction.

If number of validators who executed each validation algorithm does not match the criteria for the number of times each algorithm in the set of algorithms must be executed during the validation of a transaction, the method 200 moves to 214 to repeat the distribution process of 204. If the criteria were met, the method 200 moves to 210.

The method 200 may include at 208 determining whether more than a threshold percentage of the validators provide "pass" determination(s). If the threshold percentage is met, the method 200 will validate the transaction and move to 210. If the threshold percentage is not met, the method 200 will terminate the transaction. In one embodiment, the method 200 inserts a record of the failed transaction into the blockchain at 210. A second embodiment ignores the failed transaction and simply terminates processing at 216.

At 210, the method 200 distributes a validated transaction to the block builders 106 to include into a next block in the blockchain. The block created is integrated into an associated blockchain at 210. In one embodiment, the block includes the identity of the new owner of the goods/services transacted and the facial image of the new owner. The facial image is stored in the block created such that a subsequent transaction can use the stored facial image for further processing, e.g., validation or audit.

The method 200 at 210 may include any blockchain mechanism for building blocks from approved transactions. One embodiment uses "proof of work" when creating a block. Another embodiment uses "proof of stake" when creating a block. The mechanism used is independent of the present disclosure. In one embodiment the block builders 106 are different from the validators 108. In another embodiment, the validators 108 may also play the role of block builder 106.

Figure 3:
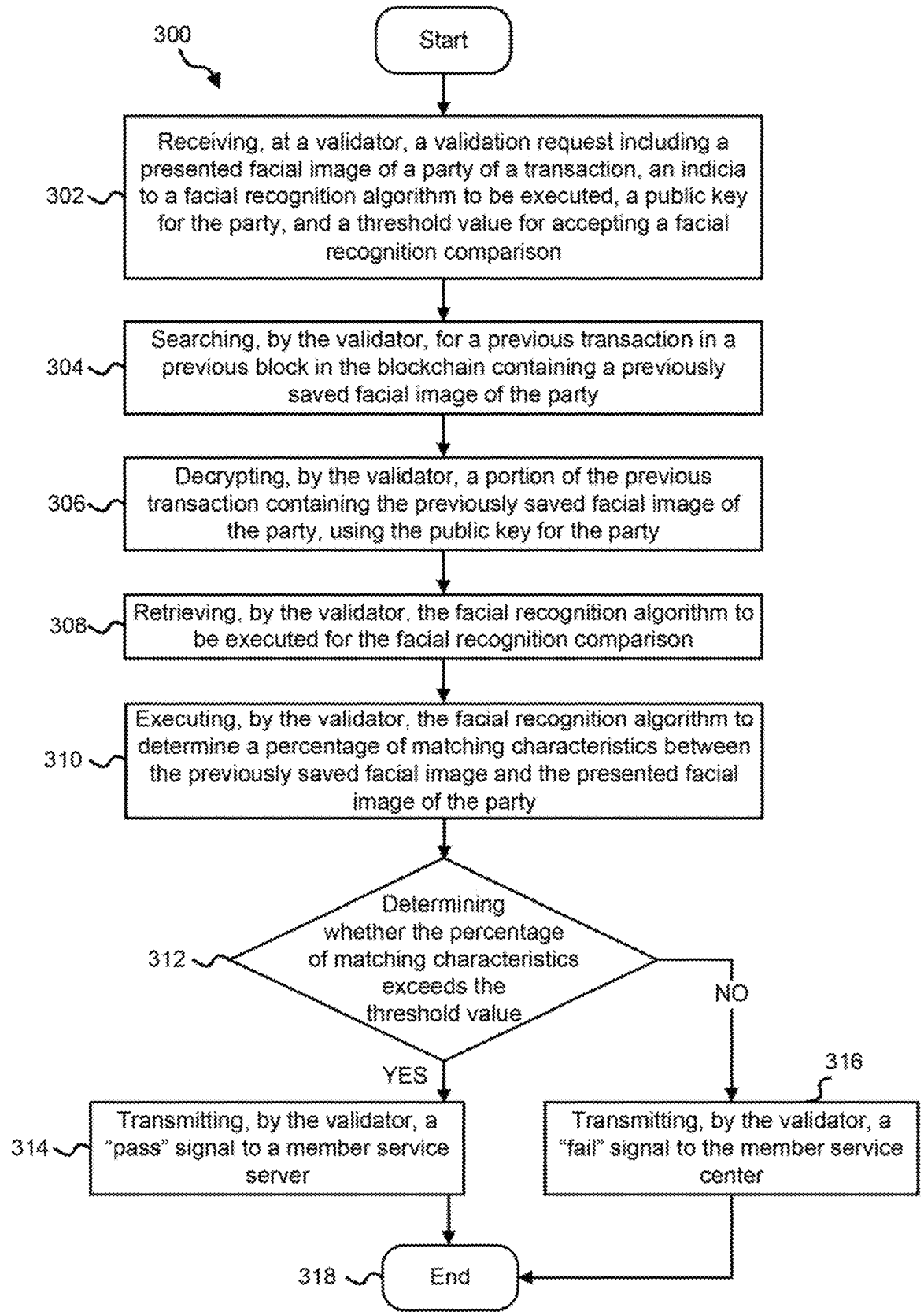
FIG. 3 is a method of transaction validation for a validator according to one embodiment of the disclosure.

FIG. 3 is a method 300 of transaction validation for a validator 108a, 108b, 180c according to one embodiment of the disclosure. The each validator 108a, 108b, 180c includes a processor to execute instructions. The method 300 includes 302 receiving, at a processor of a validator, from a server 104 a validation request including a presented facial image (e.g., first facial image) of a requestor. This first facial image is the most recent image presented for the transaction. In one embodiment, the method 300 may require the requestor to take the first facial image at the time the transaction is requested, e.g., asking the requestor to face the camera and take a picture. In one embodiment, also receiving at 302 an indicia to the facial recognition algorithm to be executed, the public key for the requestor, and a threshold value for accepting the facial recognition comparison and approving the transaction.

The method of 300 includes 302 wherein each validator chooses a validation algorithm from the set of adversarial validation algorithms determined by a random selection process that uses time as a factor to select the validation algorithm.

The method of 300 includes 302 wherein each validator may execute a plurality of the adversarial validation algorithms and return to the member service server 104 a separate pass/fail signal for each algorithm executed along with an indicia for each algorithm executed.

The method 300 includes retrieving, by the processor, a previously saved facial image (e.g., a second facial image) of the requestor previously stored. In one embodiment, the requestor can be either a buyer, a seller, or a third party. Based on the identity of the requestor, the method 300 will access a second facial image previously stored of the requestor. The second facial image at 304 may be stored in a block of the blockchain as described in 210. In another embodiment, the second facial image at 304 may be an indicia, mutually agreed to by the parties where the second facial image is stored.

The method 300 includes 306 decrypting, by the processor, the second facial image using the public key of the requestor. In another embodiment, the facial images are stored unencrypted rather than encrypted and the processing skips this step.

The method 300 includes 308 retrieving, by the processor, the facial recognition algorithm to use in comparing the first facial image and second facial image. In one embodiment genesis block of the blockchain includes the algorithm or other indicia for the algorithm. The genesis block describes the nature of the blockchain and rules for participating in the blockchain. A second embodiment includes the algorithm or an indicia for the algorithm in a smart contract of the blockchain. A third embodiment includes the algorithm in the validators.

The method 300 includes 310 executing, by the validator, the facial recognition algorithm to determine a percentage of matching characteristics between the previously saved facial image and the presented facial image of the party. At 310, the method may also include comparing, by the processor, various facial features of the first and second facial images. Different facial features can be compared. Different facial recognition algorithms may compare different facial features, e.g., skin tone, hair color, eyebrow color, eye color, eye sizes, retina pattern, distance between eyes, lip shape/size, nose shape/size, cheek shape, etc. In one embodiment, different facial recognition algorithms may give different weights to different facial features. For example, one facial recognition algorithm can be generally expressed as $Q=w_1f_1+w_2f_2+w_3f_3+ \ldots w_nf_n$, wherein Q is a final score; w is a weight factor for the corresponding facial feature; f is the facial feature; n is any positive integer representing numbers of facial features considered in the algorithm. In one embodiment, the various $w_i$ are coefficients, wherein the summations of $w_i$ is 1, which can be expressed as $1=\Sigma_{i=1}^{n}w_i$. In some embodiments, different facial recognition algorithms may have different combination of facial features and weight factors. Each algorithm may have a first predetermined threshold θ for Q, if Q>θ, then the determination is "pass;" if Q<θ, then the determination is "fail."

The method 300 includes 310 providing, by the processor, a score to a similarity of the first and second facial images based on the comparison. In one embodiment, the score is the Q mentioned above.

The method 300 includes 312 determining whether the percentage or a score exceeds a threshold. In one embodiment, the threshold is the first predetermined threshold θ mentioned above.

If Q>θ or Q=θ, then the method 300 moves to 314 and the determination is "pass." The "pass" signal means the facial recognition comparison at 310 shows the first facial image and the second facial image are similar enough. In one embodiment, this means the transaction-in-interest can be approved, as determined by the particular validator. Note, other validators' determination may also be considered before a final decision can be made to approve the transaction-in-interest.

If Q<θ, the method 300 moves to 316 and the determination is "fail." The "fail" signal means the facial recognition comparison at 310 shows the first facial image and the second facial image are not similar enough. In one embodiment, this means the transaction-in-interest should not be approved, as determined by the particular validator.

Figure 4:
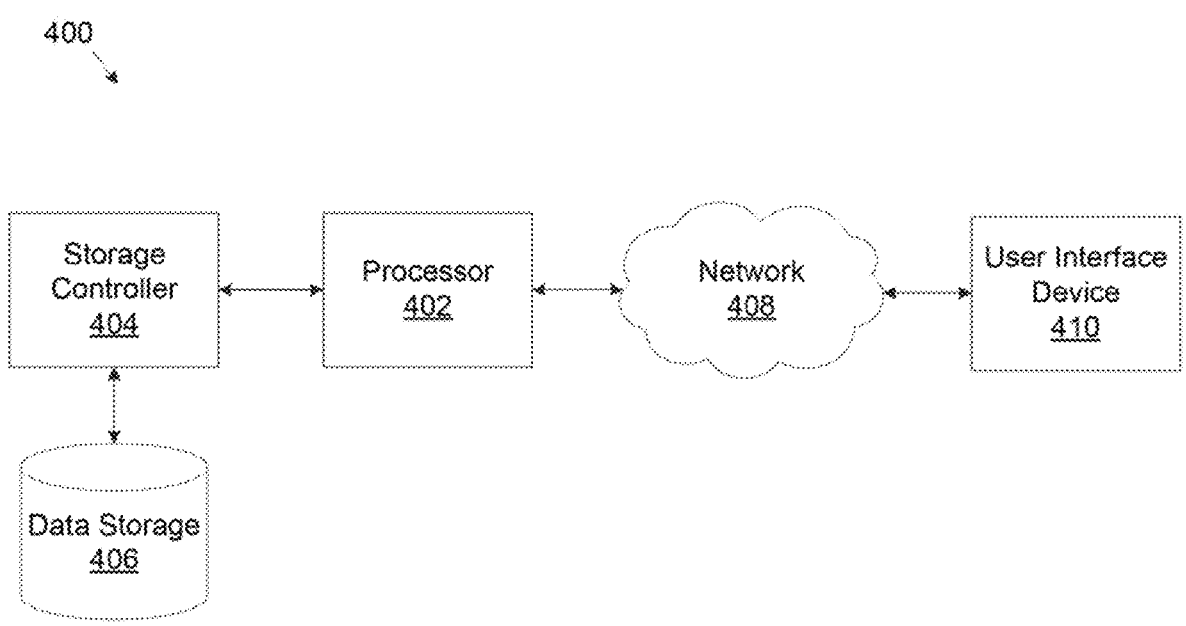
FIG. 4 illustrates a computer network for obtaining access to database files in a computing system according to one embodiment of the disclosure.

FIG. 4 illustrates a computer network 400 for obtaining access to database files in a computing system according to one embodiment of the disclosure. The processor 402 can be the processor of a participant device 102, a member service server 104, a validator 108, and/or a block builder 106.

The system 400 may include a processor 402, a data storage device 406, a network 408, and a user interface device 410. The processor 402 may execute a hypervisor-based system executing one or more guest partitions hosting operating systems with modules having server configuration information. In a further embodiment, the system 400 may include a storage controller 404, or a storage server configured to manage data communications between the data storage device 406 and the processor 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone or other mobile communication device having access to the network 408. In a further embodiment, the user interface device 410 may access the Internet or other wide area or local area network to access a web application or web service hosted by a server having the processor 402 and may provide a user interface for enabling a user to enter or receive information.

The network 408 may facilitate communications of data between the processor 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
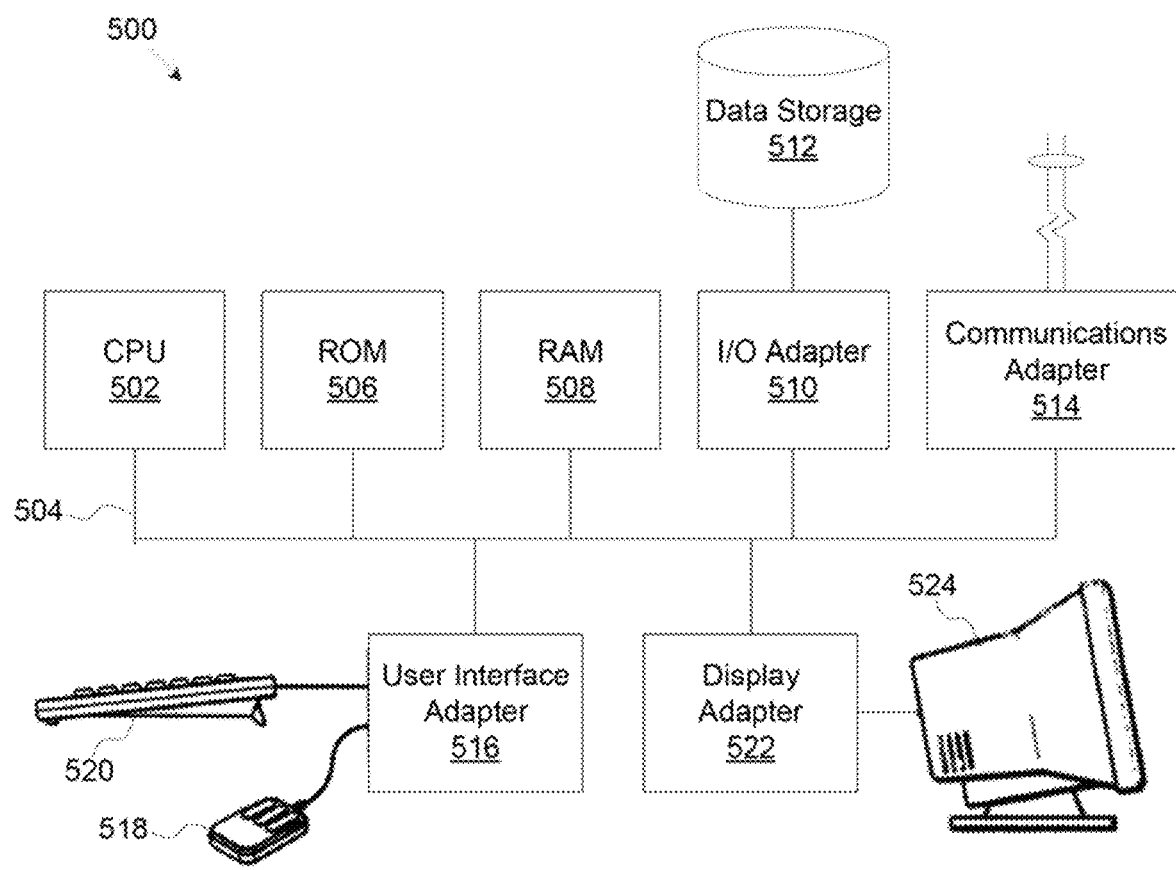
FIG. 5 illustrates a computer system adapted according to certain embodiments of the processor and/or the user interface device.

FIG. 5 illustrates a computer system 500 adapted according to certain embodiments of the processor 502 and/or the user interface device 510. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an I/O adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 508, which may be one or more of a LAN, WAN, and/or the Internet. The user interface adapter 516 couples user input devices, such as a keyboard 520, a pointing device 518, and/or a touch screen (not shown) to the computer system 500. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server and/or the user interface device. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 500 may be virtualized for access by multiple users and/or applications.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A blockchain architecture, comprising
a service server that receives a validation request from a participant device, the validation request including a facial image of a party, an indicia to execute facial recognition and a threshold value for accepting the facial recognition;
a first validator that receives the facial image from the service server and executes a first facial recognition algorithm to generate a first score and transmitting the first score to the service server;
a second validator that receives the facial image from the service server and executes a second facial recognition algorithm, different than the first facial recognition algorithm, to generate a second score and transmitting the second score to the service server;
wherein the service server determines if the first and second scores exceed the threshold value, and if so, transmits a validated transaction record to be included in a block and if not, transmits a failure transaction record to be included in a block, the block being created and integrated into a blockchain by a block builder.

2. The blockchain architecture of claim 1, wherein the first validator receives the facial image at a first time and the second validator receives the facial image a second time, different than the first time, and the first and second time being used as a seed for randomly selecting a validation method.

3. The blockchain architecture according to claim 1, wherein the first and second facial recognition algorithms consider one or more facial features when performing the facial recognition.

4. The blockchain architecture according to claim 3, wherein the first and second facial recognition algorithms gives each of the facial features a different weight factor when performing the facial recognition.

5. The blockchain architecture according to claim 1, wherein the block includes the facial image.

6. The blockchain architecture according to claim 1, wherein the validation request includes a public key and a private key.

7. The blockchain architecture according to claim 6, wherein the facial age of the party is encrypted using the private key.

8. The blockchain architecture according to claim 1, wherein the first and second score include a first and second identification, respectively, of the facial recognition algorithm used by the first and second validator, respectively.

9. The blockchain architecture according to claim 1, wherein the first validator searches for a previous transaction in a previous block in the blockchain for a saved facial image of the party and compares the saved facial image of the party to the facial image received from service server.

10. The blockchain architecture according to claim 9, wherein the second validator searches for a previous transaction for a saved facial image of the party and compares the saved facial image of the party to the facial image received from the service server.

* * * * *